United States Patent [19]
Darnell

[11] 3,770,422
[45] Nov. 6, 1973

[54] PROCESS FOR PURIFYING EU AND YB AND FORMING REFRACTORY COMPOUNDS THEREFROM

[75] Inventor: Alfred J. Darnell, Woodland Hills, Calif.

[73] Assignee: Rockwell International Corporation, El Segundo, Calif.

[22] Filed: June 11, 1971

[21] Appl. No.: 152,321

[52] U.S. Cl.................. 75/103, 75/0.5, 75/121, 75/152, 423/263, 423/299, 423/409, 423/508, 423/509, 423/511, 423/561
[51] Int. Cl..................... C22b 59/00, C01f 17/00
[58] Field of Search............... 75/0.5 R, .5 A, .5 BB, 75/103, 121; 23/20, 21, 24 R, 315, 134, 204; 423/263

[56] References Cited
UNITED STATES PATENTS
3,009,977   11/1961   Honston..................... 23/315 UX
3,353,907   11/1967   Shafer........................ 23/50 R OTHER PUBLICATIONS
Thompson et al., "Journal of Physical Chemistry," Vol. 70, Mar., 1966, pp. 934–935.
Howell et al., "Journal of Less-Common Metals," Vol. 19, 1969, pp. 399–404.
Miller et al., "Rare Earth Research," The Macmillan Co., N.Y., 1961, pp. 232–240.
Warf et al., "Journal of Physical Chemistry" Vol. 60, 1956, pp. 1590–1591.

*Primary Examiner*—Herbert T. Carter
*Attorney*—L. Lee Humphries et al.

[57] ABSTRACT

Europium and ytterbium are obtained in a highly purified and reactive state by dissolving these rare earth metals in liquid ammonia to form an ammoniate complex, and then recovering the metals by low-temperature decomposition of the ammoniate complex and complete removal of the ammonia solvent. Preferably the dissolution of these metals in liquid ammonia is performed under reflux conditions, ammonia-insoluble impurities being removed by filtration prior to the low-temperature recovery of the metals from the liquid ammonia in an inert atmosphere.

The so-obtained highly purified europium and ytterbium are recovered in a finely divided chemically active state and readily react with the chalcogens of group VI A and the pnictogens of group V A of the Periodic Chart to form the refractory chalcogenides and pnictogenides of these metals. Preferably the reaction of the rare earth metals with the chalcogens and pnictogens is accomplished using a solid-gas phase reaction at elevated temperatures.

10 Claims, 1 Drawing Figure

PATENTED NOV 6 1973 3,770,422
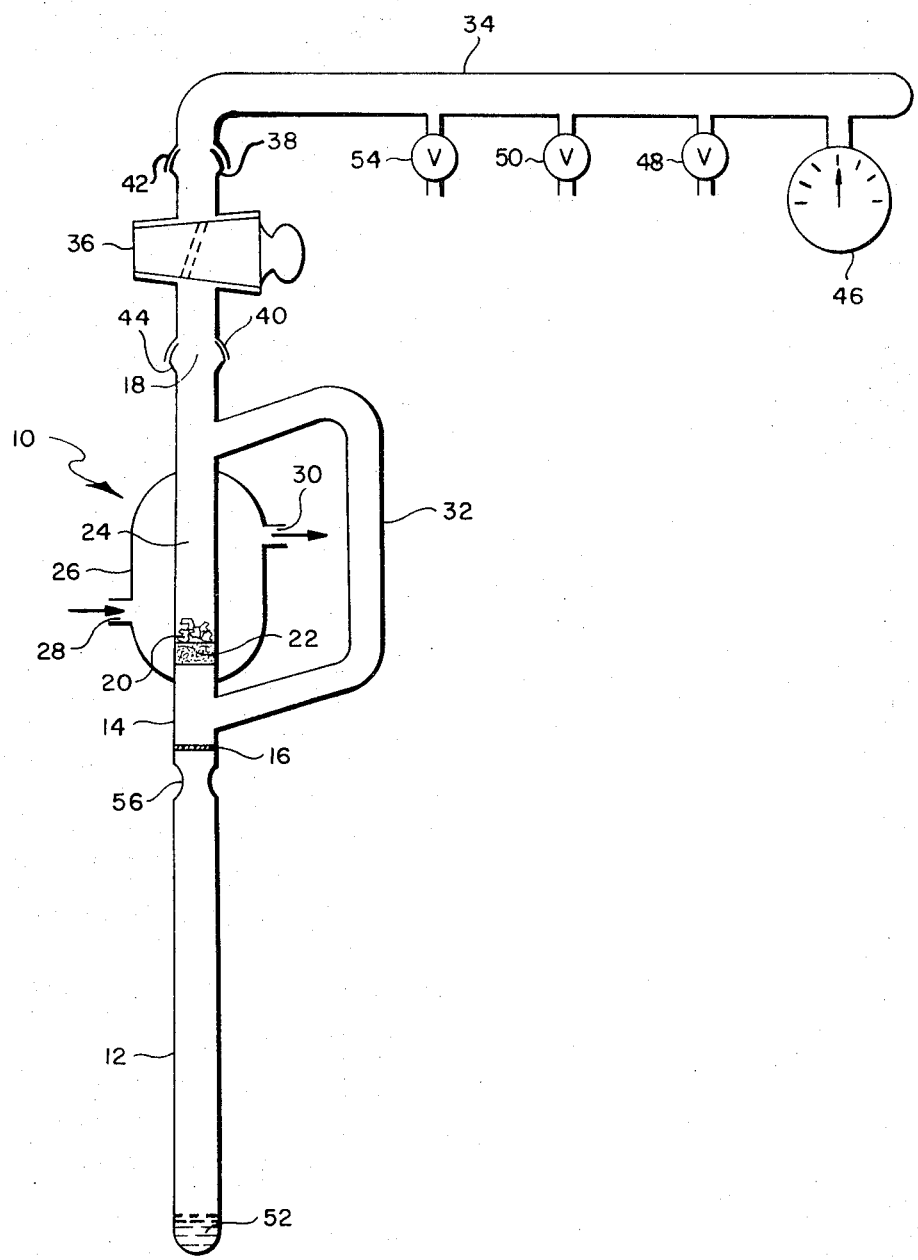
INVENTOR.
ALFRED J. DARNELL
BY Henry Kolin
ATTORNEY

PROCESS FOR PURIFYING EU AND YB AND FORMING REFRACTORY COMPOUNDS THEREFROM

BACKGROUND OF THE INVENTION

This invention relates to a process for obtaining elemental europium and ytterbium in a highly purified form and of enhanced reactivity. It further relates to forming the refractory chalcogenide and pnictogenide compounds of europium and ytterbium by reaction of the so-obtained highly active, purified rare earth metals with the corresponding chalcogen and pnictogen elements.

The rare earth metals find many varied applications of increasing technological interest as they become more available commercially. Thus, europium finds increased application in color television tubes, nuclear reactor control rods, and lasers. The rare earth elements also form high-melting refractory compounds that are semiconducting. Such compounds are of interest for use in thermoelectric devices for operation at elevated temperatures. Ytterbium sulfide is illustrative. Rare earth titanate and rare earth mixed sulfide-selenide thermoelectric materials are shown, for example, in U.S. Pats. Nos. 2,985,700 and 3,009,977, respectively. In U.S. Pat. No. 3,353,907, the preparation of europium sulfide and europium selenide is described. Elemental europium and either sulfur or selenium are dissolved in liquid ammonia, and the ammonia solution is heated above its boiling point to precipitate the europium sulfide or selenide, which is then dried in a hydrogen atmosphere. Pytlewski and Howell (Chemical Communs. 1967, 1280) have described the preparation of europium and ytterbium phosphides by passing phosphine gas into europium and ytterbium solutions in liquid ammonia.

In general, the electrical properties of semiconductors are markedly influenced by the presence of impurities or crystalline imperfections. Hence, where europium or ytterbium is used for electronic applications, such as a dopant for phosphors or in forming semiconductive materials, it is important to obtain these rare earth metals in an extremely high degree of chemical purity. Furthermore, in preparing the high-melting refractory chalcogenides and pnictogenides of europium and ytterbium, it is advantageous to have the Eu and Yb metal in a finely divided highly reactive form so that refractory compound formation may be accomplished at much lower temperatures than ordinarily feasible by direct reaction of the elements, thereby minimizing the introduction of impurities into the crystal lattice.

SUMMARY OF THE INVENTION

It is an object of the present invention to provide europium and ytterbium metal in a highly purified, finely divided form having enhanced chemical reactivity. It is a further object of the invention to react the so-obtained rare earth metals with the chalcogens of group VI A and the pnictogens of group V A of the Periodic Chart, preferably as a solid-vapor phase reaction so as to produce semi-conductive refractory compounds having enhanced thermoelectric properites.

In accordance with this invention, europium or ytterbium metal is purified by first dissolving it in liquid ammonia, in which it forms a deep-blue solution. The blue-colored chemical complex or intermediate compound that is apparently formed is readily decomposed into ammonia and the elemental rare earth metal by the low-temperature removal of ammonia under reduced pressure or vacuum conditions. The low-temperature removal of at least 90 wt. percent of the ammonia, preferably at least about 99 percent, is preferably accomplished by distilling off the ammonia at a temperature between about $-50°$ and $-125°C$, preferably at a temperature between about $-60°$ and $-90°C$., under continuous evacuation down to about $10^{-4}$ torr. The initial pressure used in evacuating the ammonia corresponds to the vapor pressure of the liquid or solid ammonia at the low temperature used, the pressure being continuously reduced so that final evacuation is at a pressure of about $10^{-4}$ torr to remove the last traces of ammonia. A conventional rotating-piston mechanical pump is conveniently used to accomplish evacuation of the ammonia to about $10^{-2}$ torr, and then a diffusion pump is generally used to complete the evacuation at about $10^{-4}$ torr or lower.

The freezing point of pure ammonia is $-77.7°C$. At this temperature the liquid ammonia solution forms a slush, dependent in part on the amount that the freezing point is lowered by the dissolved europium or ytterbium. A temperature of about $-78°C$ is conveniently obtained and preferably utilized both for the dissolution and the ammonia-removal steps by employing a constant-temperature bath of solid carbon dioxide (Dry Ice) and acetone or isopropyl alcohol. In general, it is preferred to use as low a temperature as is consistant with the lowering of the vapor pressure and the increased rate requirements for removal of almost all of the ammonia within a given period of time. At $-50°C$ the vapor pressure of liquid ammonia is about 307 torr, whereas at $-125°C$ the vapor pressure of the solid is only about 0.1 torr. At $-78°C$ the vapor pressure of the liquid or slushed ammonia is about 38 torr, and this is convenient for rapid removal of the ammonia. Such substantial removal can be accomplished at this temperature within a time range of but several minutes to a few hours depending on the pump capacity and the amount of ammonia to be removed. Final removal of traces of ammonia may be accomplished by gradually raising the temperature to about 250°C while maintaining high vacuum evacuation. After removal of all traces of ammonia, generally at about $10^{-4}$ torr, the material that remains is the rare earth metal, europium or ytterbium, present in a purified state free from any ammonia or other nitrogen-containing compounds, and in a finely divided, highly reactive state so that it readily combines with the chalcogen elements of group VI A or the pnictogen elements of group V A to form the corresponding chalcogenides and pnictogenides.

Liquid ammonia solutions of europium and ytterbium metals have been extensively studied. Thompson et al reported (J.Phys. Chem 70, 934 (1966)) that on gradually removing the ammonia from europium and ytterbium solutions, the solutions turned from a deep blue to a bronze color, with a bronze-colored solid remaining, believed to be the corresponding hexaammoniate. Howell and Pytlewski, reported in "The Decomposition Products of Solutions of Europium and Ytterbium Metals in Liquid Ammonia" (J. Less Common Metals, 19, 399 (1966)) on the catalytic decomposition of liquid ammonia solutions of europium or ytterbium at a temperature of $-50°C$. The ammonia was allowed to evaporate, and the resulting solid product was then removed or thermally decomposed at about 230°C. The initial product obtained as the diamide of europium or ytterbium. Thermal decomposition of these products apparently resulted in the formation of imides and nitrides. They also discussed the results of other workers who have reported obtaining the diamide and triamide compounds of europium and ytterbium at temperatures of 25°C, 50°C, and higher.

However, we have found that it is an important feature of this invention that the complete decomposition of the ammoniate complex to yield the pure ytterbium and europium metals can be accomplished by maintaining the temperature of the ammonia solution below −50°C, preferably below −60°C, and using continuous evacuation until at least 90 wt. percent of the ammonia, preferably at least about 99 percent of the ammonia, has been removed at these low temperatures. It is particularly preferred in order to avoid formation of an undesired complex between the rare earth metal and the ammonia during the ammonia removal step that evacuation of the ammonia be accomplished at a temperature between −78° and −90°C at which temperature the ammonia is in the solid phase. The temperature may then be gradually raised to remove any remaining ammonia, temperatures up to 250°C being used to remove any final traces of ammonia at these higher temperatures while maintaining high-vacuum conditions. Under these conditions of substantial low-temperature evacuation, amide formation is avoided and the europium and ytterbium metals are obtained in a highly purified and active state.

Where the starting europium or ytterbium is already in a highly purified state, filtration of the ammoniacal solution prior to distillation may be dispensed with. Removal of the ammonia so as to recover the rare earth metal in a finely divided reactive state is the desideratum. Thus any convenient method may be utilized for dissolving europium or ytterbium metal in liquid ammonia and then distilling off the ammonia at a temperature below −50°C at reduced pressure so as to recover the rare earth metal therefrom.

However, in its particularly preferred aspects, the present process for the purification of europium or ytterbium metal and recovery in a finely divided reactive state ordinarily requires filtration of the solution prior to recovery of the rare earth metal from the liquid ammonia, preferably maintaining an inert atmosphere such as argon during the refluxing and filtration stages and subsequent thereto so as to prevent possible oxide formation, where formation of the oxide is not desired. The dissolution of the rare earth metals is preferably performed under reflux conditions using a high-purity ammonia, e.g., ammonia triple-distilled over sodium or potassium, so as to maintain and enhance the purity of the rare earth metal as well as promote its rapid solution in the solvent while minimizing the amount of liquid ammonia required. At the same time ammonia-insoluble impurities are conveniently removed by filtration during the reflux process. The recovered rare earth metal is obtained in finely divided powder form, generally of a size distribution passing through at least a 100-mesh U. S. Standard sieve size screen. The fine state of subdivision of the metals particularly enhances their reactivity.

The present process is also of utility as an extraction process: e.g., both europium and ytterbium may be selectively leached from a mixture of misch metal, which may be obtained commercially in a calcium-free form. Alkali and alkaline earth metals require removal either prior or subsequent to ammonia treatment because of their ready solubility in liquid ammonia. The europium and ytterbium metals will be dissolved from the misch metal by the liquid ammonia, while the remaining lanthanide metals present in the misch metal will be retained on the filter as ammonia-insoluble components. However, the present process is particularly preferred for the further purification of europium or ytterbium metal already commercially available in a 99.9 percent purity vacuum-distilled grade, as well as for preparing it in a finely divided state having enhanced chemical reactivity.

In a further aspect of the invention, chalcogenides and pnictogenides of europium and ytterbium are readily obtained in a state of high purity by utilizing the highly purified finely divided rare earth metals as starting materials. Preferably compound synthesis is by direct combination of the elements; it is particularly preferred that chalcogen or pnictogen vapor be reacted with the europium or ytterbium in the solid state, i.e., a gas-solid phase reaction. Temperatures as low as 400°C may be utilized for compound formation. However, higher temperatures are generally preferred since the reaction rate increases as the temperature is raised, resulting in more rapid compound formation. Thus it is generally preferred to perform the direct combination reaction at temperatures between 450° and 600°C. It has been found that at temperatures above 600°C some reactivity occurs with the silica vessels in which the reactions are generally performed. In general, elevated temperatures are found to favor formation of the monochalcogenides and monopnictogenides. Thus where it is desired to utilize considerably higher temperatures than 600°C, it is preferable to line the silica reaction vessels with alumina or magnesia coatings so as to avoid product contamination. Thereby highly purified monochalcogenide and monopnictogenide products are directly obtained.

BRIEF DESCRIPTION OF THE DRAWINGS

The sole FIGURE of the drawing is an elevational schematic view of a reflux apparatus for purification of ytterbium and europium metal.

DESCRIPTION OF THE PREFERRED EMBODIMENTS

In its broadest aspects, the present process is useful for separating europium and ytterbium metals from admixture with the other rare earth metals of the lanthanide series, as in misch metal, because of the selective solubility of these two metals in liquid ammonia. At −78°C the solubility of Yb and Eu in liquid ammonia is 43 and 70 gm/liter, respectively. Thus where a commercially available calcium-free misch metal is treated with liquid ammonia, europium and ytterbium metals are selectively leached therefrom. Where desired, further separation between the so-obtained europium and ytterbium is accomplished by a liquid-liquid ion-exchange process.

However, the present process in its preferred aspects is of particular utility for the further purification of already relatively pure europium and ytterbium metals where the metal is to be directly used for electronic applications or as a reactant for forming thermoelectric elements of enhanced purity and correspondingly improved thermoelectric properties. While the pnictogenides as well as the chalcogenides of ytterbium and europium are of general interest and utility as semiconductive materials, particularly including those pnictogenides formed by reaction of these rare earth metals with nitrogen, phosphorus, arsenic, antimony, and bismuth, the invention will be principally described with respect to the formation of the semiconducting chalcogenides of europium and ytterbium, particularly of sulfur, selenium, and tellurium, because of the commercial interest in these compounds as thermoelectric materials. It has also been found that various ternary compounds, e.g., the mixed chalcogenides of oxygen amd sulfur, sulfur and selenium, selenium and tellurium, and others, may be prepared in a high degree of purity.

1. PURIFICATION OF EUROPIUM AND YTTERBIUM

Referring to the drawing, a reflux apparatus 10 is provided consisting of a suitable container 12, preferably of quartz, sealed to the bottom end of a condenser 14, suitably of Pyrex glass, by a seal 16, generally a graded Pyrex glass-quartz seal. The rare earth metal ytterbium or europium is introduced into the reflux apparatus 10 at an opening 18 at the upper end of condenser 14. The rare earth metal is conveniently introduced in the form of granules or small lumps 20 subdivided from a purified ingot of the metal. The rare earth metals ytterbium and europium are commercially available in ingot form as a vacuum-distilled grade having a purity of 99.9 percent, and such ingots preferably serve as a source of the starting material. The small metal lumps 20 initially rest on the upper surface of a fritted-glass filter 22 which is located in a central liquid path 24 of condenser 14. The condenser is provided with an outer jacket 26 having an entrance port 28 and an exit port 30 for circulating a refrigerant therethrough to cool the liquid path portion 24 of condenser 14. A vapor return path 32 bypasses the cooled liquid path 24 and thereby provides the desired circulating reflux action.

Following introduction of the rare earth metal lumps 20 into reflux apparatus 10, a gas supply manifold 34 is connected to condenser 14 by means of an intermediate stopcock 36 having ball and socket joints 38 and 40 at opposite ends thereof. These joints are seated with the corresponding mating joints 42 and 44 of gas manifold 34 and condenser 14, respectively, so as to form a gas-tight seal. Manifold 34 is equipped with a pressure gage 46 and several ports for supplying gases to apparatus 10 or for evacuating gases therefrom.

After the rare earth metal lumps 20 are introduced into the reflux apparatus 10 to be retained on filter 22, and gas manifold 34 is connected to condenser 14, the system is evacuated to a pressure of less than $10^{-4}$ torr by connecting a valved port 48 to a suitable vacuum system. Then a supply of ammonia gas is admitted to the manifold 34 by way of a valved port 50 and then fed to the reflux apparatus 10. Since the boiling point of ammonia is −33°C and its freezing point is −78°C, many refrigerants are suitable for liquefying the ammonia. Also, because ammonia in the solid state has a relatively high vapor pressure of sublimation, it may be used as a solvent at temperatures below its freezing point. Alternatively, dissolution of the europium or ytterbium metal in liquid ammonia may be accomplished at a temperature between −33° and −78°C, followed by vacuum removal of the ammonia at much lower temperatures. Conveniently, acetone cooled by contact with solid carbon dioxide is circulated through the outer jacket 26. Such a cooling mixture has a temperature of about −78°C and provides a suitably cooled liquid path 24 for liquefying the ammonia as well as a suitable temperature at which the ammonia is subsequently removed. The precise temperature present in the cooled liquid path will depend in part upon the heat losses associated with the condenser 14.

Ammonia-insoluble impurities contained within the rare earth metal lumps, such as metal oxides or elements and compounds which are insoluble in liquid ammonia or have a lower solubility therein than europium or ytterbium, are retained on the fritted-glass filter 22. Ytterbium or europium metal is dissolved in the ammonia and collects in the bottom of container 12 as a deep-blue solution 52. During the reflux stage, a suitable quantity of an inert gas, e.g., helium or argon, is conveniently introduced to the system by way of a valved port 54 to control the rate of reflux. The ammoniacal solution 52 containing the complexed rare earth salt is then decomposed by evacuation of the system by means of the valved port 48.

Temperatures between −50° and −125°C, preferably below −60°C, are suitably employed for the decomposition reaction under reduced pressure evacuation, the ammoniacal complex being readily decomposable over this temperature range while avoiding amide formation. A temperature of about −78°C is preferably and conveniently utilized. After completion of the decomposition reaction, which is indicated by pressure gage 46 attaining a steady-state value, container 12 is conveniently sealed off at a necked portion 56. The recovered purified rare earth metal present in the bottom of container 12 is recovered as a finely divided powder. Spectroscopic analysis confirms its high purity. Where the starting rare earth metal has an initial purity of 99.9 percent, a final purity of 99.99 percent is attained. Further, the increased reactivity of the recovered rare earth is particularly apparent when it is reacted with sulfur, selenium, or tellurium to form the corresponding chalcogenides.

2. SYNTHESIS OF COMPOUNDS OF EU AND YB

Several methods have been reported for the synthesis of the rare earth semiconductive compounds, and particularly the rare earth monochalcogenide compounds because of interest in these semiconductive materials for forming thermoelectric elements. Typical methods of synthesis include direct combination of the elements at elevated temperatures, reaction in liquid ammonia, reaction of the metal hydride with chalcogen vapor or hydrogen chalcogenide, and reaction of the metal halide or oxide with hydrogen chalcogenide. For example, in U.S. Pat. No. 3,009,977 a process is provided for producing a thermoelectric material in which the rare earth metal, sulfur, and selenium are admixed in finely divided particle form, the admixed materials are reacted at an elevated temperature, and the resultant mass is cooled to ambient temperature and then compacted to a desired configuration. The compact is thereafter fired at an elevated temperature.

Many of the described preparative methods have various drawbacks, particularly where it is desired to produce the rare earth compound in a very high degree of purity for electronic applications. Most methods of indirect synthesis which introduce a third element or corrosive reactant increase the likelihood of contamination of the resulting semiconductive material. Also, several of the reactions produce the higher chalcogenides or mixtures thereof, and such methods are generally objectionable where only the rare earth monochalcogenide compound is desired.

In general, compound synthesis by a direct combination of the elements is preferable. However, the use of a solid-solid reaction is less desirable because of the higher temperatures that are likely to occur because of the highly exothermic nature of the reaction. Such runaway temperatures increase the likelihood of introducing contaminants from the reaction vessel. Compound formation in liquid ammonia presents problems of non-stoichiometric or undesired compound formation, as well as requirements for decomposition of any ammonia complex formed and also removal of the solvent. It has been found that because of the high degree of reactivity of the finely divided europium and ytterbium metal obtained by the purification process of the present invention, compound synthesis is preferably performed by direct combination of the elemental chalcogen or pnictogen in the vapor state with the rare earth metal in a finely divided, highly reactive solid state, i.e., a gas-solid phase reaction.

Such a reaction is conveniently carried out with the components contained in separate but connecting sections of an evacuated sealed quartz ampule. The components may be conveniently transferred under an inert atmosphere to the quartz reaction vessel. Alternatively, the apparatus used in the purification of the europium and ytterbium metal has a side arm already containing the chalcogen of pnictogen element attached to the container vessel of the purification apparatus. In this synthesis technique, the condensed phases of the chalcogen and pnictogen and of the rare earth metal are kept separated to preclude the chance occurrence of a rapid, exothermic reaction which tends to occur upon direct contact of the condensed phases at elevated temperatures. The rare earth metal also tends to react with the quartz container at the extremely high temperatures which occur in such a runaway reaction condition. Further, physical separation of the condensed phases of the reactant elements also permits separate control of the temperature of these components. Thereby the chalcogen vapor pressure may be regulated so as to determine the rate of the gas-solid reaction.

While relatively low temperatures of 450° to 600°C are preferred for obtaining compound formation of high purity, at such temperatures it is difficult to obtain the monochalcogen compound MX exclusively, even though it is the principal reaction product formed. As used herein, M represents ytterbium or europium and X represents a chalcogen or pnictogen, generally sulfur, selenium, or tellurium. However, while the monochalcogenide MX formed at low temperatures will contain $M_2X_3$ and $M_3X_4$, such a mixture is converted to only the monochalcogenide compound by heating the mixture to much higher temperatures (900°–1,650°C). At these temperatures any unreacted metal and $M_2X_3$ and/or $M_3X_4$ are converted to the thermodynamically more stable compound MX. Such a high temperature conversion process is conveniently carried out in a tantalum tube furnace at a pressure of less than $10^{-5}$ torr.

Where it is desired to produce ternary compounds which consist of compounds of mixed chalcogens, methods essentially similar to those herein utilized for forming the binary compounds MX may be used. In the preparation of such mixed compounds, the nonmetal elements are first fused and mixed in the molten state so that a vapor of relatively constant composition is obtainable from the mixture for reacting with the rare earth metal. This procedure results in formation of a more homogeneous ternary compound than is obtained by reaction of the separate or unmixed nonmetal elements with the rare earth metal. Such a mixed-vapor procedure is particularly suitable for preparing the ternary compounds $YbS_xSe_{1-x}$ and $YbSe_xTe_{1-x}$ where x has any value between zero and unity.

3. PREPARATION OF THERMOELECTRIC ELEMENTS

Because of the utility of rare earth semiconductive compounds in thermoelectric applications, the prepared semiconductive compounds of europium and ytterbium were fabricated into a form suitable for characterization of their electrical and thermal properties. Both hot-press and cold-press fabrications methods are suitably used. Hot-press methods are generally preferable because of the greater degree of compaction of the thermal element obtainable therewith together with the ability to heat treat the element in the same operation. In such a hot-press fabrication method, the rare earth chalcogenide or pnictogenide compound in powdered form is loaded into a graphite piston-die assembly and simultaneously heated and compressed while under high vacuum. The graphite dies utilized are of a high purity and oriented so that the C-axis of the graphite is parallel to the axis of the mold and pistons. The graphite is outgassed in a high vacuum at 1,600°C before use. The rare earth compound is subjected to pressures up to 5,000 psi and to temperatures up to 1,550°C. The degree of compaction of these powdered samples is monitored by use of a dial gage indicator located between the pistons. In general, the rare earth compounds experience plastic flow at temperatures from 1,000 to 1,200°C. The compacted specimens are then stress relieved by removing the pressure while maintaining them at the maximum temperature of operation. Then the elements are annealed by slowly decreasing the temperature to that of the ambient.

The relative merit of a given thermoelectric material may be expressed in terms of an index of efficiency, M. The higher the index of efficiency, the more efficient is the thermoelectric device in converting heat to electrical energy. The index of efficiency for a thermoelectric element is defined as follows:

$M = T\bar{S}^2/4\rho K$ wherein T is the absolute temperature, $\bar{S}$ is the Seebeck coefficient (volts/°C), $\rho$ is the resistivity (ohm-cm), and K is the thermal conductivity (watts/cm°C). Several methods have been described in the literature for measuring these values. Since the various chalcogenides and pnictogenides of europium and ytterbium are used within a relatively narrow temperature range, and there is not too great a variation among these compounds with regard to their thermal conductivities, the electrical power number $\bar{S}^2/\rho$ represents a convenient measure of relative efficiency.

A typical thermoelectric device is basically characterized as comprising two semiconducting thermoelectric circuit members or elements bonded to a conductor, typically a block of metal which may, for example, be of aluminum, copper, or iron, to form a thermoelectric junction. The two members are thermoelectrically complementary types: one member is made of P-type thermoelectric material and the other of N-type material. When the thermoelectric device is acting as a thermoelectric generator in accordance with the Seebeck effect, the semiconductive material is designated as P-type where flow of conventional current in the external circuit is from the thermoelectrical material; the material is designated as N-type where flow of current in the external circuit is toward the thermoelectric material. It has been found that the ytterbium chalcogenides are generally P-type, whereas the europium chalcogenides are generally N-type.

The following examples are illustrative of the several aspects of this invention, but are not intended to restrict the scope of this invention as previously described herein.

EXAMPLE 1

A 1.0000 gram sample of ytterbium metal in the form of granules approximately 1 mm in diameter and having a purity of 99.8 percent was charged into a Pyrex-quartz apparatus 10 of the type illustrated in the drawing. The ytterbium metal particles were placed upon the upper surface of a fritted-glass filter 22 sealed into the apparatus. The system was then pumped down to a pressure of less than $1 \times 10^{-3}$ torr. A ballast bulb of approximately 2 liters volume containing purified ammonia gas at a pressure of about 755 torr was then opened to the reaction chamber. A refrigerant consisting of acetone cooled by solid carbon dioxide was circulated through the condenser 26. The refrigerant inlet temperature was maintained between $-77.7°C$ and $-33°C$. This resulted in condensation of liquid ammonia in contact with the ytterbium metal granules. Dissolution of the Yb metal occurred, the resulting solution being concurrently filtered through the fritted-glass filter to remove the ammonia-insoluble impurities.

The quartz receiver tube 12 was kept at a reduced temperature, preferably close to the atmospheric boiling point of liquid ammonia, at approximately $-32°C$. Thereby reflux of the liquid ammonia over the metal chips contined until essentially all of the ytterbium metal solution had passed through the glass filter. This point of complete solution was readily noted since the liquid ammonia passing through the filter became clear, dissolved Yb imparting a deep-blue color to the liquid ammonia solution.

The ammonia was then pumped from the system, which was maintained under continuous evacuation at a temperature of about $-78°C$ until the pressure fell to less than $5 \times 10^{-3}$ torr. Further evacuation was continued, the filtered metal sample being kept at about $-32°C$. The filtered metal sample was then brought to ambient temperature, which resulted in further release of gaseous ammonia. Evacuation was continued until a pressure of less than $1 \times 10^{-5}$ torr was attained. The metal was then heated to 200°C at a rate of 1°–3°C per minute rise in temperature while continuing evacuation at below $10^{-5}$ torr.

This process yielded 1.003 grams of powdered metal ytterbium. In Table 1 are shown the impurity analyses for the sample before and after the ammonia purification process was carried out.

TABLE 1

Impurities in Ytterbium Metal Before and After Purification Process

| Impurities by Emission Spectroscopy | Yb Ingot, As-Received (wt %) | After Ammonia Purification Process (wt %) |
|---|---|---|
| Yttrium | 0.005 | n.t. |
| Manganese | 0.001 | n.t. |
| Silicon | 0.01 | <0.01 |
| Magnesium | 0.01 | 0.01 |
| Calcium | 0.04 | 0.04 |
| Aluminum | <0.01 | <0.01 |
| Iron | <0.01 | <0.01 |
| Tantalum | Detected | n.t. |
| Nickel | 0.01 | n.t. | n.t. = No trace found

Using the same apparatus as used for the foregoing purification of ytterbium metal, in a similar manner europium metal is dissolved in liquid ammonia and purified.

EXAMPLE 2

The apparatus shown in the drawing was modified by fusing a second quartz container as a side arm to the main quartz container at a point below the necked seal-off region 56 and also by eliminating the fritted-glass filter 22 and vapor return path 32. Into the fused-quartz reaction tube side arm was charged 0.4890 gram sulfur having a purity of 99.999 percent. The system was evacuated to a pressure of less than $1 \times 10^{-4}$ torr and then filled with purified argon at atmospheric pressure. The sulfur was next melted and allowed to solidify within the appendage side arm.

Then 1.5956 grams of ytterbium metal lumps having a purity of 99.5 percent was charged into the main body of the quartz vessel. The reaction apparatus was evacuated to a pressure of less than $1 \times 10^{-3}$ torr. The reaction vessel was then closed by a vacuum stopcock, detached from the vacuum system at a ground-glass ball joint, and weighed. The weight of the vessel with its charge of ytterbium metal and sulfur was 160.3153 gms. The reaction vessel was then attached to the gas manifold 34 and re-evacuated to a pressure of less than $1 \times 10^{-3}$ torr. The main body of the reaction tube containing the ytterbium metal was cooled to $-75°C$, and 60 cc. of purified ammonia was condensed into the tube. The entire amount of metallic ytterbium present was thereby dissolved in the liquid ammonia forming a blue-colored complex. The ammonia was then removed by pumping on the metal-ammonia system while maintaining it at a temperature between $-87.7°C$ and $-77.7°C$ until all liquid and solid phases of ammonia had been removed from the system. The reaction tube containing the ytterbium was then warmed to room temperature followed by heating to 150°C at a rate of from 1° to 3°C per minute while maintaining the system at a pressure below $5 \times 10^{-3}$ torr. The reaction tube and its contents were then cooled and separated from the manifold. The ytterbium consisted of a finely divided powder, metallic grey in appearance. The weight of the reaction tube and its contents was determined to be 160.3196 grams.

The quartz reaction chamber containing the main and side arms was fused-sealed under vacuum at a construction seal-off point 56 and then placed in a dual temperature-zone furnace. The ytterbium metal was heated to a temperature of 700°C, and the sulfur was heated to a vapor-phase temperature of 450°C. Chemical reaction between the sulfur vapor and powdered ytterbium was complete in about 5 hours. The reaction product was then heated at a temperature of 900°C for about 1 hour to effect complete conversion of the reaction product of ytterbium and sulfur to the monosulfide compound YbS.

After cooling the reaction tube to room temperature, it was broken open under an inert atmosphere. The obtained reaction product weight 3.0862 grams. An x-ray diffraction pattern of the product showed it to consist of ytterbium monosulfide, YbS, with a sodium chloride type structure (space group Fm3m) with a lattice parameter ($a_o$) of 5.6727 ± 0.0003 angstroms at 25°C.

YbS into a tantalum foil furnace and heating the charge at a temperature of 1,650°C for a period of 10 minutes at a pressure of less than $1 \times 10^{-7}$ torr to remove any volatile impurities present. A loss of weight of approximately 0.05 percent occurred.

The YbS was then charged into a graphite mold and compacted using a pressure of 5,000 pounds per square inch at a temperature of 1,400°C into a cylindrical pellet having a diameter of 0.25 inch and a length of 0.517 inch. The density of this pellet was 7.02 grams/cc.

Typical process parameters for preparing pellets of the ytterbium chalcogenides for determination of thermoelectric properties as shown in Table 2.

TABLE 2.—PROCESS PARAMETERS FOR PREPARING YTTERBIUM MONOCHALCOGENIDE THERMOELEMENTS

| | Compound formation | | Conversion to monochalcogenide | | Hot press fabrication | |
|---|---|---|---|---|---|---|
| | Time (hrs.) | Temp. (°C.) | Time (min.) | Temp. (°C.) | Time (min.) | Temp. (°C.) |
| YbS | 8–16 | 535 | 10 | 1,650 | 10 | 1,400 |
| YbSe | 20–30 | 535 | 20 | 1,950 | 10 | 1,475 |
| YbTe | 20–30 | 535 | 10 | 1,650 | 10 | 1,400 |

EXAMPLE 3

The procedure of Example 2 used for the preparation of ytterbium monosulfide was followed using 0.3297 gram ytterbium metal and 0.1504 gram selenium of 99.99 percent purity to yield 0.4826 gram YbSe of crystal structure type Fm3m having a lattice parameter $a_o$ of 5.9365 ± 0.0005 angstroms at 25°C.

EXAMPLE 4

The procedure of Example 2 used for the preparation of ytterbium monosulfide was followed using 0.3573 gram ytterbium metal and 0.2635 gram tellurium of 99.99 percent purity to yield 0.6264 gram YbTe of crystal structure type Fm3m having a lattice parameter $a_o$ of 6.360 ± 0.001 angstrom.

EXAMPLE 5

The procedure of Example 2 used for the preparation of ytterbium monosulfide was followed using 0.2073 gram europium metal and 0.1741 gram tellurium of 99.99 percent purity to yield 0.3871 gram EuTe of crystal structure type Fm3m having a lattic parameter of 6.600 ± 0.001 angstroms.

EXAMPLE 6

The procedure of Example 2 used for the preparation of ytterbium monosulfide was followed for the preparation of $YbS_{0.75}$-$Se_{0.25}$ using 0.5283 gram ytterbium metal, 0.0733 gram sulfur of 99.99 percent purity, and 0.0603 gram selenium of 99.999 percent purity. The elemental sulfur and selenium were thoroughly mixed in their molten state prior to combining them with the ytterbium metal. Reaction of these elements results in a single homogeneous phase of crystal structure type Fm3m having a lattice parameter $a_o$ of 5.750 ± 0.001 angstroms at 25°C. This reaction yielded a product of 0.6683 gram.

EXAMPLE 7

The ytterbium monosulfide obtained in Example 2 was further purified by charging 3.0107 gram of the While the process of this invention has been particularly described with reference to ytterbium and the preferred chalcogenides thereof, homogeneous compositions of europium chalcogenides and of the pnictogenides of ytterbium and europium may also be prepared in accordance with the same methods. Thus while the invention has been particularly described with reference to preferred embodiments thereof, it will be understood by those skilled in the art that various changes in form and details therein may be made without departing from the spirit and scope thereof.

What is claimed is:

1. The process of preparing ytterbium or europium rare earth metal of enhanced purity and activity which comprises dissolving the said rare earth metal in liquid ammonia, maintaining the temperature of said ammonia containing the dissolved rare earth metal at between −50°C and −125°C while removing said ammonia by evacuation under reduced pressure, said pressure being continuously reduced until any metal-ammonia complex present has been decomposed and substantially all the ammonia except for trace amounts has been removed, and continuing said evacuation at a temperature between 50°C to 250°C under reduced pressure for a period of time sufficient to remove said trace amounts and provide as a recoverable residue a finely divided powder of said rare earth metal of enhanced purity and activity.

2. The process according to claim 1 wherein the ammonia solution is filtered to remove any ammonia-insoluble impurities present therein prior to removal of the ammonia.

3. The process according to claim 1 wherein the maintained temperature between −60° and −90°C until the final reduced pressure is not greater than $10^{-4}$ torr.

4. The process according to claim 3 wherein said temperature for removal of the ammonia is maintained at a temperature between −78 and −90°C where the ammonia is in the solid phase.

5. The process according to claim 4 wherein the ammonia solution is filtered to remove any ammonia-insoluble impurities present therein prior to recovery of the metal from the liquid ammonia and wherein said trace amounts of ammonia are removed by gradually raising the temperature to not greater than about 250°C.

6. The process according to claim 1 wherein the finely divided metallic powder of enhanced purity and reactivity is reacted with elemental chalcogen or pnictogen to form the corresponding chalcogenide or pnictogenide.

7. The process according to claim 6 wherein the rare earth metal compound is prepared using a solid-vapor phase reaction, the rare earth metal element being in the solid state and the nonmetal element being in the vapor state.

8. The process according to claim 7 wherein the rare earth metal is ytterbium and the nonmetal element is selected from sulfur, selenium, tellurium, and mixtures of sulfur and selenium and of selenium and tellurium.

9. The process according to claim 8 wherein sulfur and selenium are intimately admixed in the solid state prior to volatilization to the vapor state, and the formed chalcogenide is a ternary compound having the formula $YbS_xSe_{1-x}$ wherein $x$ has a value greater than zero and less than unity.

10. The process according to claim 8 wherein selenium and tellurium are intimately admixed in the solid state prior to volatilization to the vapor state, and the formed chalcogenide is a ternary compound having the formula $YbSe_xTe_{1-x}$ wherein $x$ has a value greater than zero and less than unity.

* * * * *

UNITED STATES PATENT AND TRADEMARK OFFICE
CERTIFICATE OF CORRECTION

PATENT NO. : 3,770,422

DATED : Nov. 6, 1973

INVENTOR(S) : Alfred J. Darnell

It is certified that error appears in the above-identified patent and that said Letters Patent are hereby corrected as shown below:

Column 1, line 1, (and [54] on front page)   In title, "EU AND YB" should read --Eu AND Yb--;

line 4,   Insert the following paragraph --The invention herein described was made in the course of or under a contract with the Advanced Research Projects Agency of the Department of Defense.--

Column 9, line 46, "contined" should read --continued--.

Column 12, line 59, after "temperature" insert --is--.

Signed and Sealed this eighteenth Day of May 1976

[SEAL]

Attest:

RUTH C. MASON
Attesting Officer

C. MARSHALL DANN
Commissioner of Patents and Trademarks